(12) United States Patent
Grävingholt et al.

(10) Patent No.: US 11,639,270 B2
(45) Date of Patent: May 2, 2023

(54) CONTAINER TRANSPORT MACHINE FOR TRANSPORTING CONTAINERS, SUCH AS BEVERAGE BOTTLES, CANS, AND SIMILAR CONTAINERS, AND PACKAGES OF CONTAINERS OR OTHER PRODUCTS

(71) Applicant: KHS GMBH, Dortmund (DE)

(72) Inventors: Stefan Grävingholt, Witten (DE); Thomas Greiving, Luedinghausen (DE); Berthold Paroth, Dortmund (DE); Zlatko Sarajlija, Dortmund (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/175,908

(22) Filed: Feb. 15, 2021

(65) Prior Publication Data
US 2021/0163228 A1    Jun. 3, 2021

Related U.S. Application Data

(63) Continuation-in-part of application No. PCT/EP2019/071673, filed on Aug. 13, 2019.

(30) Foreign Application Priority Data

Aug. 16, 2018  (DE) .......................... 102018119914.7

(51) Int. Cl.
*B65G 21/20* (2006.01)
*B65G 15/62* (2006.01)

(52) U.S. Cl.
CPC ......... *B65G 21/2054* (2013.01); *B65G 15/62* (2013.01); *B65G 2201/025* (2013.01); *B65G 2201/0238* (2013.01); *B65G 2201/0244* (2013.01); *B65G 2201/0252* (2013.01)

(58) Field of Classification Search
CPC ........ B65G 21/2054; B65G 2201/0238; B65G 2201/0244; B65G 2201/025; B65G 2201/0252; B65G 15/60; B65G 21/16; B65G 15/62; B65G 21/20; B65G 21/22
See application file for complete search history.

(56) References Cited

U.S. PATENT DOCUMENTS

| 3,779,368 | A | * | 12/1973 | Smith | B65G 21/02 198/841 |
|---|---|---|---|---|---|
| 4,793,470 | A | | 12/1988 | Andersson | |
| 5,031,757 | A | * | 7/1991 | Draebel | B65G 17/086 198/852 |
| 5,074,407 | A | * | 12/1991 | Brumby | F16F 1/422 198/860.3 |
| 5,788,056 | A | * | 8/1998 | Clopton | B65G 13/11 198/779 |
| 6,170,649 | B1 | | 1/2001 | Radandt et al. | |
| 6,612,426 | B1 | | 9/2003 | Guerra et al. | |

(Continued)

FOREIGN PATENT DOCUMENTS

| CN | 1868835 A | 11/2006 |
|---|---|---|
| CN | 201486656 U | 5/2010 |

(Continued)

*Primary Examiner* — Mark A Deuble
(74) *Attorney, Agent, or Firm* — Laurence A. Greenberg; Werner H. Stemer; Ralph E. Locher

(57) ABSTRACT

A container transport machine for transporting containers, such as beverage bottles, cans, and similar containers, and packages of containers or other products.

15 Claims, 5 Drawing Sheets

(56) References Cited

U.S. PATENT DOCUMENTS

| | | | |
|---|---|---|---|
| 6,796,418 B1* | 9/2004 | Harrison | B65G 21/06 198/861.1 |
| 7,753,194 B1 | 7/2010 | Jager et al. | |
| 7,971,707 B2* | 7/2011 | Elsner | B65G 21/22 198/841 |
| 8,337,971 B2* | 12/2012 | Yaver | F16F 7/00 428/167 |
| 9,262,564 B2* | 2/2016 | Plummer | G06Q 30/0278 |
| 11,247,844 B2* | 2/2022 | Grävingholt | B65G 15/62 |
| 2000/4216987 | 11/2004 | Wiggins | |
| 2004/0216987 A1* | 11/2004 | Wiggins | B65G 15/62 198/841 |

FOREIGN PATENT DOCUMENTS

| | | |
|---|---|---|
| CN | 203611893 U | 5/2014 |
| CN | 204870442 U | 12/2015 |
| CN | 206611110 U | 11/2017 |
| DE | 19637353 | 3/1998 |
| JP | 3942008 | 7/2007 |
| NL | 2004378 | 9/2011 |
| WO | 0234650 | 5/2002 |

* cited by examiner

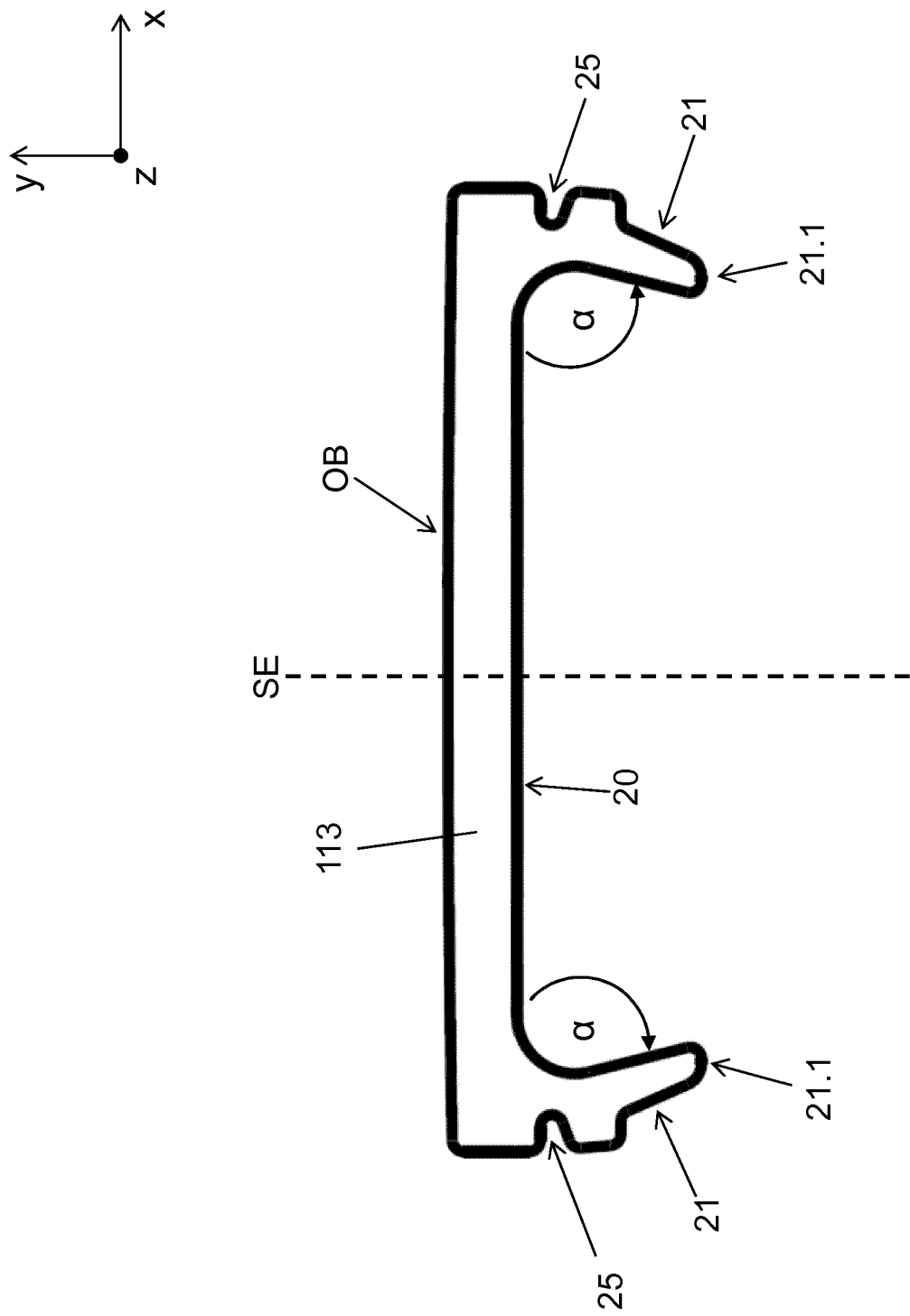

CONTAINER TRANSPORT MACHINE FOR TRANSPORTING CONTAINERS, SUCH AS BEVERAGE BOTTLES, CANS, AND SIMILAR CONTAINERS, AND PACKAGES OF CONTAINERS OR OTHER PRODUCTS

CROSS-REFERENCE TO RELATED APPLICATIONS

The present application is a Continuation-in-Part of International Patent Application No. PCT/EP2019/071673, filed Aug. 13, 2019, which claims the benefit of Federal Republic of Germany Patent Application No. DE102018119914.7, filed Aug. 16, 2018, each of which is incorporated by reference herein in its entirety.

BACKGROUND INFORMATION

1. Technical Field

The application relates to a container transport machine for transporting containers, such as beverage bottles, cans, and similar containers, and packages of containers or other products.

Beverage bottle filling machines, or simply filling machines, are used in the beverage bottle filling or bottling industry to fill bottles with a liquid beverage. Such machines can be of a rotary or linear design. Rotary beverage bottle filling machines include a rotary carousel or rotor or similar structure that has a plurality of individual beverage bottle filling devices or beverage bottle filling stations mounted or positioned on the perimeter or periphery thereof. In operation, an individual beverage bottle is received or picked up from a bottle or container handling device or machine, such as another bottle treatment machine or a container transport or conveyor, which can be either of a rotary or linear design, and held at a corresponding individual filling device or station. While the rotary carousel rotates, each individual filling device or filling station dispenses a beverage, such as soft drinks and sodas, wine, beer, fruit juices, water, or other beverages, or another liquid product. Each individual filling device is usually designed to fill one beverage bottle or similar container at a time. Upon completion of filling, the beverage bottle or container is released or transferred to yet another bottle or container handling device or machine, such as another bottle treatment machine or transport device. The filling devices are therefore designed to fully dispense a predetermined or desired amount or volume of product into the beverage bottles or containers before the beverage bottles or containers reach the exit or transfer position out from the filling machine. The beverage bottle filling machine can also be of a linear design, wherein beverage bottles are moved to one or more filling positions along a straight or linear path.

Such filling machines are usually part of a filling or bottling plant, wherein the filling machine operates in conjunction with a number of other beverage bottle or container handling machines, such as a closing machine for placing caps or closures on filled containers, a container manufacturing machine for making or forming containers to be filled, and a container packaging machine for packaging individual containers for shipment and sale to consumers. Such plants are designed to operate as quickly and continuously as possible, and any interruptions in operation result in a loss of productivity and an increase in operating costs, especially since such plants can process large numbers of containers, such as, for example, anywhere from sixty to one hundred thousand containers per hour.

2. Background Art

This section is for informational purposes only and does not necessarily admit that any publications discussed or referred to herein, if any, are prior art.

In the field of beverage bottling, and in the broader field of packaging and container handling, it is common to use transport devices to move bottles and containers, either individually or in groups or packages, from one handling machine or location to the next. These transport devices have a number of common configurations or designs, with one of the most common designs being a conveyor belt, also known as an endless conveyor belt. The conveyor belt can be one continuous flexible belt that is driven in a circulating movement to convey items thereon along a linear transport path or direction. Transport devices generally are used in the beverage industry for transporting piece goods, and often comprise a plurality of transport elements, each forming a loop and driven such as to circulate, which transport elements may be in the form of transport chains or flat-top chains. The transport elements form in each case, with their upper length being supported against at least one guide element, the common horizontal or essentially horizontal transport plane or transport surface on which the transport goods items stand upright with their transport goods base or their standing base. For example, it is common to transport bottles and similar containers in an upright position with the container bottom or base in contact with the upper surface of the conveyor.

Such transport devices are designed to handle large numbers of containers per hour. In the beverage industry, container transport devices usually have the capability to move or process or handle, for example, more than 10,000 conveyed items per hour, and preferably more than 50,000 conveyed items per hour.

Such transport devices likewise usually comprise a frame or machine frame, on which the transport elements are received, held, and/or guided. In this situation, individual frames are usually adjusted to specific spatial dimensions in respect of their individual lengths and/or widths, such that individual frames can be combined, and the individual machines of an overall production system within the beverage industry can be combined with one another. For this purpose, the frames comprise a support body, on which profile elements, such as C-shaped profile elements, are arranged. On the upper side of these profile elements run the transport elements, usually the transport chains, wherein these are moved by drive motors in an endlessly circulating manner, and in this situation are guided so as to slide on the profile elements.

In order to reduce the friction coefficient between the profile elements and the transport elements, slide elements, such as sliding rails, can be provided which form a cover for the transport elements with a low friction coefficient. The lower friction reduces the wear and to reduces the drive forces required for the transport elements.

Currently, these sliding rails are secured by additional elements, such as screws, on the profile elements and in connection with centering disks, or by clamp elements, to thereby arrange the sliding rails securely on the profile elements. In this situation, with regard to the securing of the sliding rails on the profile elements, the sliding rails are oriented or positioned to lie flat and smooth, or essentially flat and smooth, on the profile elements.

If the sliding rails were not lying flat and smooth on the profile elements, then these irregularities would initially lead to undesirable movements of the transport chains lying on the sliding rails, which move, in part, at high speed in the transport direction. These undesirable movements, for example transverse movements or also height movements of the transport chains, transfer onto the containers being transported by the transport chains, which in worst case scenarios then fall over, making manual intervention necessary, and therefore, disadvantageously interfere with the transport. In other words, the sliding rails should present an upper surface that is as flat and as smooth as possible. The transport elements are run on top of these sliding rails, and therefore any unevenness or bumps or undulations in the sliding rails will result in unevenness or bumps or undulations in the surface formed by the transport elements. Such unevenness can create a problem in the operation of the conveyor, especially due to the high speeds of operation common to such conveyors. If, for example, bottles are being moved on the surface of the transport elements in an upright position, and the transport elements encounter or travel over an uneven or bumpy portion of the sliding rails, the sudden change in the support surface, especially if at a high speed, could easily result in the bottle being knocked over from its upright position. It is therefore advantageous if such unevenness is minimized or eliminated in order to minimize the chance of containers or packages falling over or possibly off of the conveyor.

Sliding rails are often made by an extrusion process or similar production process, and thus are often neither flat nor smooth in their longitudinal direction. In addition, these sliding rails are usually transported and delivered in the form of rolls, which can lead to further deviations from the ideal shape. Due to these deviations from the ideal shape in sliding rails made and transported in this manner, a substantial amount of structural design, mechanical, and manual effort is required in order to secure these sliding rails on the profile elements with the desired degree of smoothness and flatness. It is common to use numerous screw connections along the transport route stretch, which, during the manual assembly of the corresponding sliding rails to the related profile elements, incurs a considerable amount of time and therefore inherently also high costs. In other words, since the sliding rails are so uneven and different from the desired flat and smooth shape, it becomes necessary to invest considerable time and effort in affixing the sliding rails in position, such as by screws or bolts. For example, curved portions need to be forcefully and securely screwed down so that they are essentially flat and do not create a bump in the transport surface. In addition, uneven sections need to be affixed higher or lower in order to form an overall flat surface. These installation steps take considerable effort in order to achieve a support surface of a desired smoothness and flatness. While some degree of unevenness is permissible or to be expected, the unevenness should be minimized as much as possible to an acceptable degree, such that the support surface is sufficiently flat and smooth to minimize or prevent bottles, cans, or similar containers being knocked over or off of the conveyor during transport thereon.

BRIEF SUMMARY

The present application discloses at least one exemplary embodiment of a transport device for the transporting of beverage bottles, containers, packages, and other transport goods in a transport direction, which is designed to minimize or avoid the disadvantages of current designs disclosed herein by permitting a simple and efficient installation of the sliding rails while still producing a flat and smooth surface on the profile elements of the transport device.

In accordance with at least one possible exemplary embodiment, a transport device for transporting transport goods in a transport direction comprises at least one machine frame, arranged on which is at least one transport element. The transport elements forms a loop and is driven such as to circulate, wherein the transport element is guided via a front deflection device in relation to the transport direction and via a rear deflection device in relation to the transport direction. A transport route for the transport goods is formed by the at least one transport element between the front and the rear deflection device, wherein the at least one transport element is guided in sliding contact on at least one sliding rail at least along the transport route. The at least one sliding rail is directly connected to the profile element at least in sections along the sliding rail route, which profile element is in turn connected to the at least one support body of the machine frame. In order to achieve the direct connection, the at least one sliding rail is located and/or pressed onto the profile element in a positive fit or form fit or interlocking fit, at least in sections along the transport route. As a result, the sliding rails can be held securely on the profile elements without further additional connection structures, such as screws, bolts, or clamps. Moreover, a rising and lowering effect of the sliding rails, that is, unevenness or bumps, over their longitudinal extension is minimized or prevented by the configuration of the sliding rails.

According to a possible embodiment variant, provision can be made that, for the direct connection, the at least one sliding rail is located and/or pressed onto the profile element in positive and non-positive fit or friction fit at least in sections along the transport route.

According to a further possible embodiment variant, provision can be made that at least one sliding rail is located and/or pressed in positive and/or non-positive fit onto the profile element over its entire longitudinal extension, and is held in a fixed position on the profile element.

According to yet another possible embodiment variant, provision can be made that the at least one sliding rail is located onto the profile element in a fixed position in a parallel or essentially parallel plane underneath a transport plane.

According to yet another possible embodiment variant, provision can be made that the at least one sliding rail exhibits an essentially U-shaped cross-section surface, in that the at least one sliding rail comprises a web section, forming a basic part, and two limb sections extending laterally from the base web section.

According to yet another possible embodiment variant, provision can be made that the at least one sliding rail is configured as being of one part or of one piece.

According to yet another possible embodiment variant, provision can be made that the at least one sliding rail is configured as mirror-symmetrical to a mirror plane which is oriented perpendicular to the transport plane.

According to yet another possible embodiment variant, provision can be made that the at least one sliding rail is configured over its longitudinal extension along the transport route as identical in its cross-section.

According to yet another possible embodiment variant, provision can be made that the lateral limb sections enclose with the web section, in cross-section, in each case an angle of less than 90 degrees, or between 85 degrees and 60 degrees, or between 80 degrees and 65 degrees, or is 76 degrees.

According to yet another possible embodiment variant, provision can be made that the limb sections are configured so as to be elastically deformable, in such a way that, when the sliding rail is located and/or pressed onto the profile element, at least their free ends are pressed apart from one another, and then come in contact again, at least in positive fit, at the profile element.

According to yet another possible embodiment variant, provision can be made that the at least one sliding rail is in contact in non-positive and positive fit at lateral limb sections of the profile element, and under a defined pre-stressing force which takes effect on the limb sections. This pre-stressing force can be produced by a residual elastic deformation of the limb sections of the sliding rail which continues to pertain after the placement of the sliding rail onto the profile element.

According to yet another possible embodiment variant, provision can be made that, by the locating of the at least one sliding rail on the profile element, the inner contour of the sliding rail is in contact in positive fit on the outer contour of the profile element, possibly over the entire longitudinal extension of the sliding rail.

According to yet another possible embodiment variant, provision can be made that the at least one sliding rail exhibits a weakening of the material in the transition region from the web section to the lateral limb sections.

According to yet another possible embodiment variant, provision can be made that the at least one sliding rail exhibits a strengthening of material in the transition region from the web section to the lateral limb sections at the outer contour of the lateral limb sections.

According to yet another possible embodiment variant, provision can be made that the at least one sliding rail is located and/or pressed onto the profile element and an inlet finger in positive fit and/or non-positive fit.

According to yet another possible embodiment variant, provision can be made that the at least one sliding rail is cambered convex in cross-section on its upper side.

It should be understood that any values or ranges disclosed herein include deviations from the respective exact value by +/−10%, or possibly by +/−5%, and/or deviations in the form of changes which are not of significance for the function. Such deviations are usually indicated by relative terminology, such as "approximately" or "essentially."

Further embodiments, advantages, and possible applications of the exemplary embodiments disclosed herein also derive from the following description of exemplary embodiments and from the figures. In this context, all the features described and/or represented as images may, alone or in any combination, form part of an exemplary embodiment, regardless of their formulation in the claims or reference to them.

Although a number of aspects have been described in connection with a device, it is understood that these aspects also represent a description of the corresponding method, such that a block element or a structural element of a device is also to be understood as a corresponding method step or as a feature of a method step. By analogy, aspects which have been described in connection with a method step, or as a method step, also represent a description of a corresponding block or detail or feature of a corresponding device. Some or all of the method steps can be put into effect by an item of hardware apparatus, or by making use of an item of hardware apparatus, such as a microprocessor, a programmable computer, or an electronic circuit. With some exemplary embodiments, some or a greater number of the method steps can be carried out by such an item of apparatus.

BRIEF DESCRIPTION OF THE DRAWINGS

FIG. 5 shows a front or cross-sectional view of a sliding rail.

DETAILED DESCRIPTION

For elements or components in the exemplary embodiments shown in the figures which are the same or have the same effect, identical reference numbers are used in the figures. Moreover, for the sake of easier overview, only those reference numbers are represented in the individual figures which are required for the description or basic understanding of the respective figure. At least some of the exemplary embodiments are also represented in the figures only as a schematic view in order to explain the mode of operation. In general, some of the representations in the figures serve primarily to explain the basic principles of the exemplary embodiments, and therefore should not be understood as limiting the possible embodiments of the application. For reasons of simplicity and ease of understanding, some of the components in one or more exemplary embodiments shown in the figures have been omitted which are well known in the related technology.

In addition, for better understanding, in each case, in the figures coordinate axes or spatial axes X, Y and Z, are shown running perpendicular to one another, of which, with the embodiment shown, the X-axis and Z-axis define a horizontal or essentially horizontal XZ plane, and of which the Y-axis is oriented perpendicular to this XZ plane. In this situation, a transport plane TE is also formed by or coplanar to the XZ plane.

The exemplary transport device 100 serves to transport or convey manufactured or consumer goods or products 102, such as beverage bottles, cans, boxes, pouches, or similar containers, either individually or in groups, such as packages or packs of multiple containers, either standing loosely in a group or wrapped or contained in paper or plastic packaging material. The transport device 100 serves to transport or convey these goods 102 in at least one transport direction TA between container processing or handling machines, not represented in any greater detail, and/or pass-over stations and/or transfer stations and/or crossover stations for the packaging and/or beverage industry. The transport device 100 are designed, according to at least one exemplary embodiment, to convey at least 10,000 products 102 per hour, and, according to at least one other exemplary embodiment, to convey at least 50,000 products 102 per hour.

Figure 1:
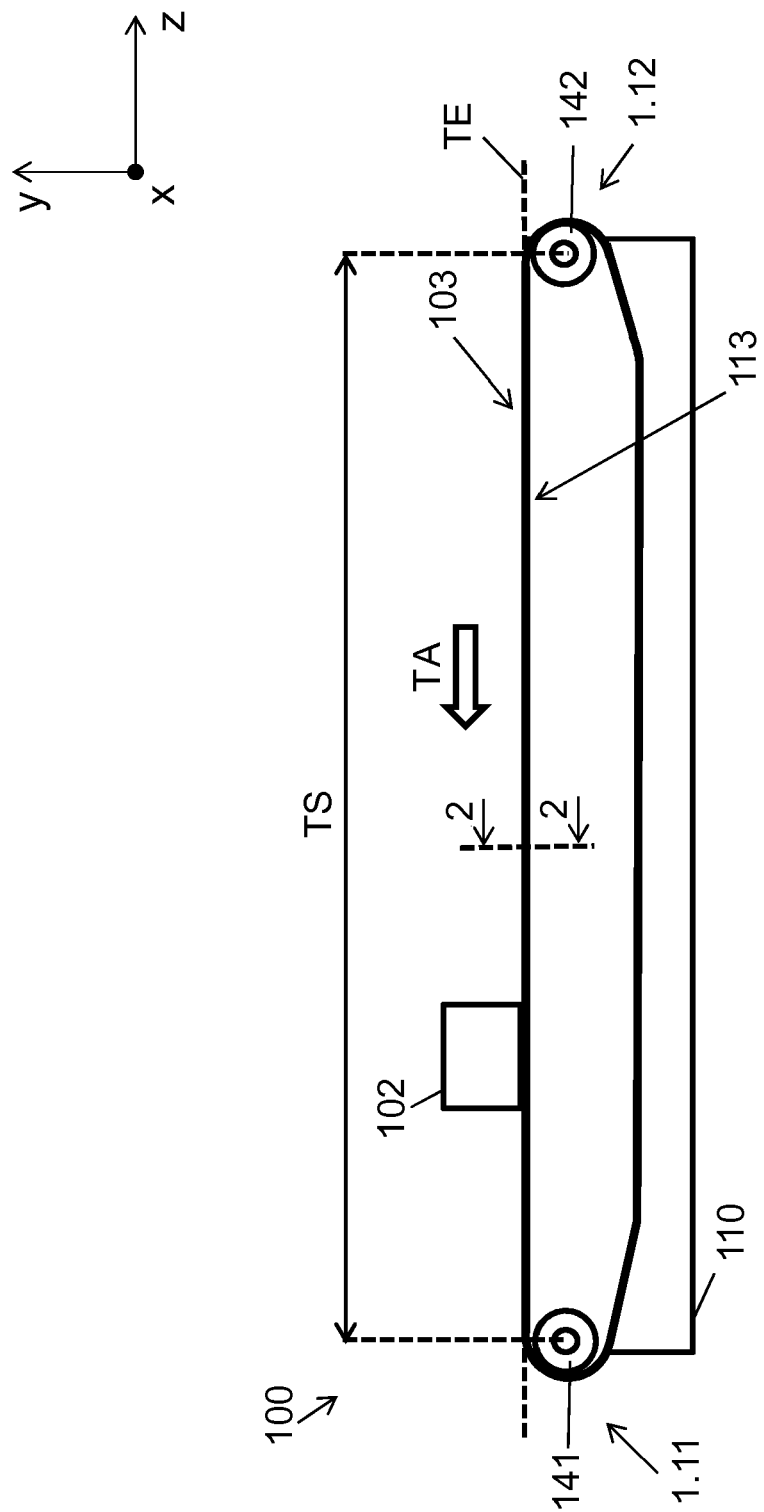
FIG. 1 shows a schematic side view of an exemplary transport device for the transporting of containers or packages, such as beverage bottles or groups of beverage bottles.
Figure 2:
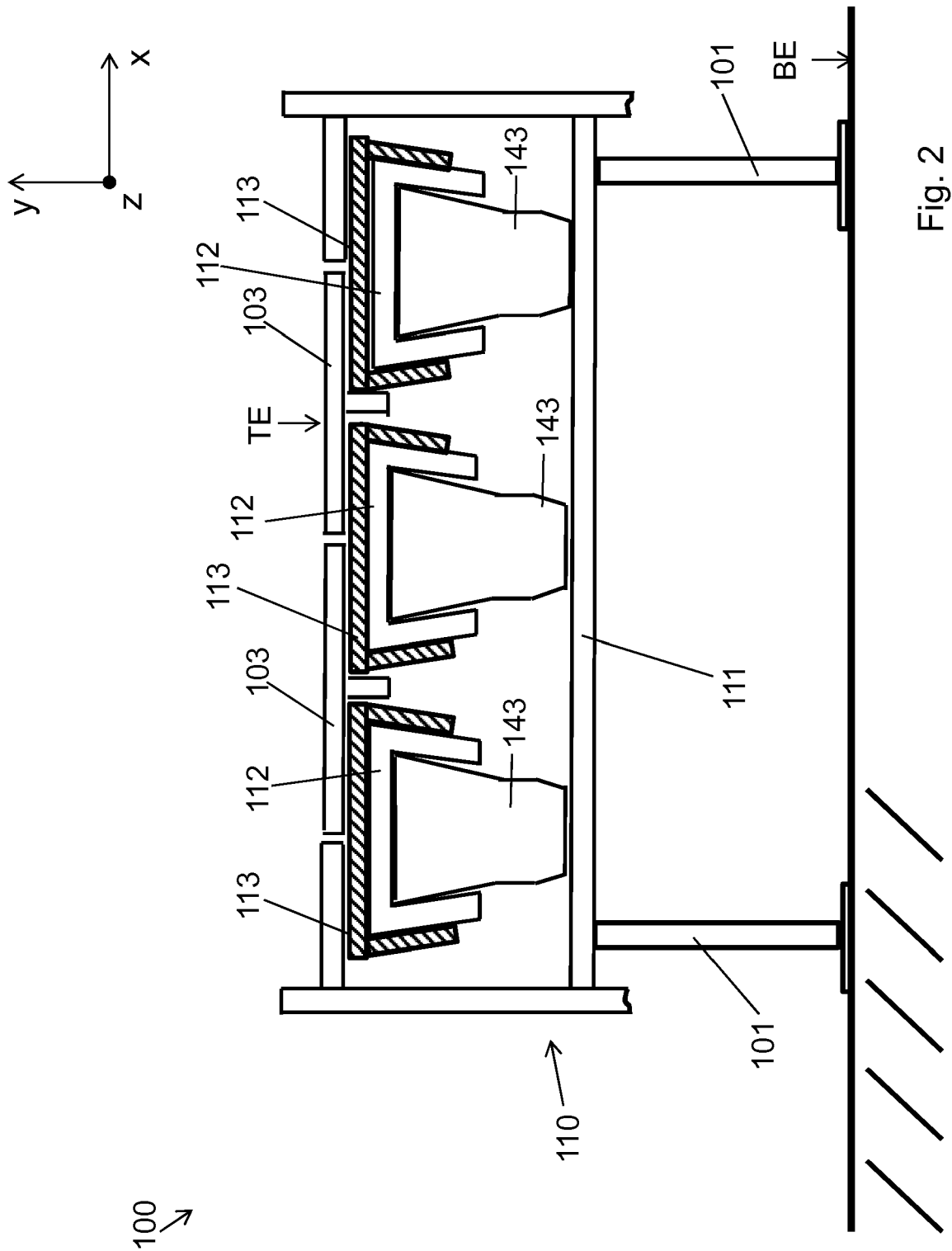
FIG. 2 shows a schematic cross-sectional view of the transport device of FIG. 1.
Figure 3:
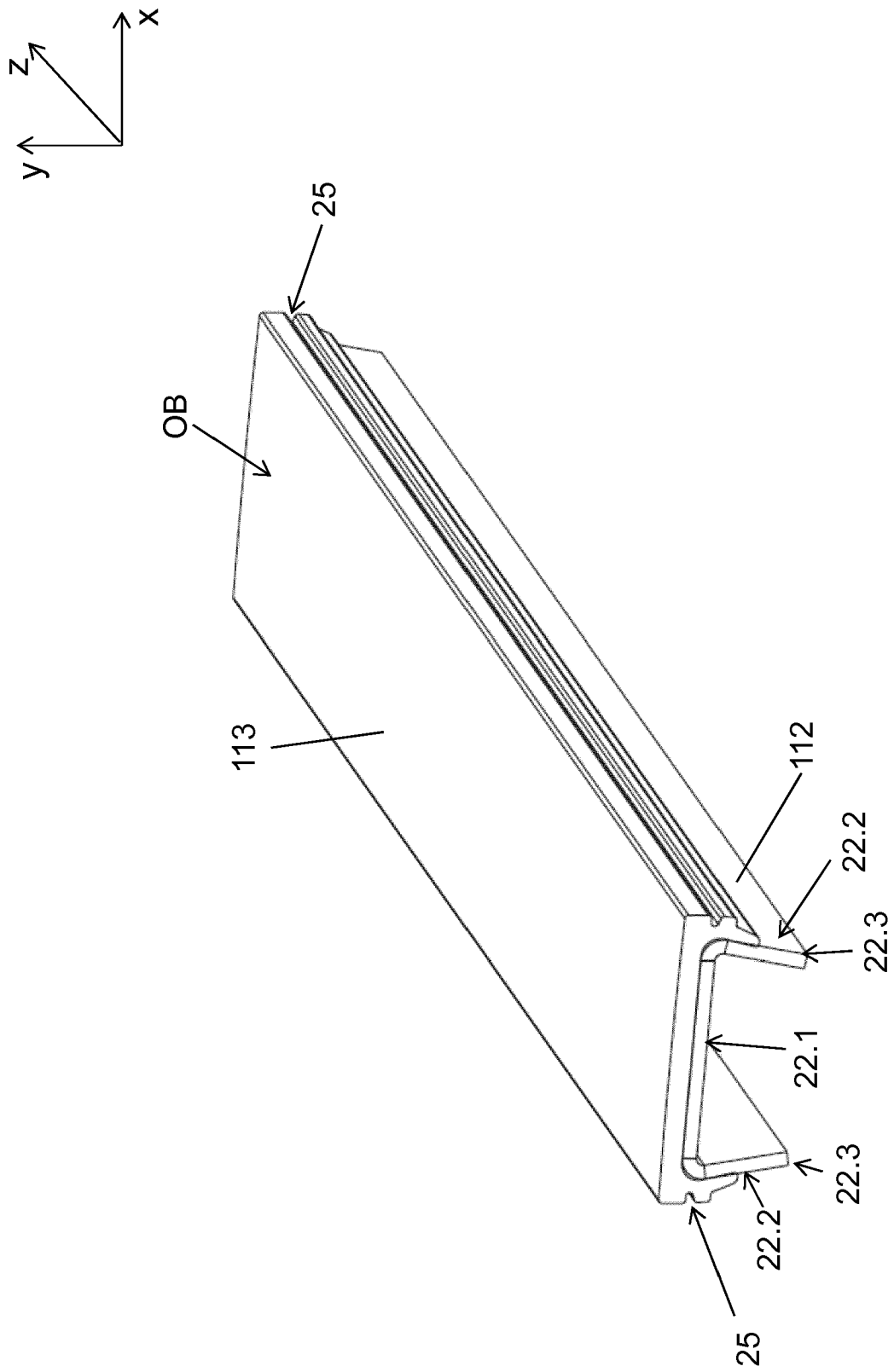
FIG. 3 shows a schematic perspective view of a profile element with sliding rails secured to it.

The transport device 100 comprises for this purpose at least one transport element 103, which can be configured as, for example, a transport belt, transport chain, flat-top chain, or transport mat that forms a closed loop and circulates endlessly in the transport direction TA. The transport element 103 is supported on its underside by at least one sliding rail 113 or sliding rail structure 113, represented in FIGS. 2 to 5. The upper side of the transport element 103 forms, at least along a transport route TS, a horizontal or essentially horizontal transport plane or surface TE disposed in or parallel to the XZ plane, on which the transport goods 102 stand upright with their transport bases or stand bases. As can be seen in FIGS. 1 and 2, the at least one transport element 103 is guided in a sliding manner at least along the transport route TS on the at least one sliding rail 113. In this situation, it is also possible for a plurality of transport elements 103, for example two, three, four, or more, to be provided, which are arranged in several rows aligned adjacent or next to one another, as viewed along a direction transverse or perpendicular to the transport direction TA, such that the plurality of transport elements 103 form, at least with a part or portion of their respective upper length of their corresponding loop, the common transport plane TE, on which the transport goods 102 can stand at least partially with their base surfaces. In other words, when any portion of the circulating transport element 103 is located above or on the at least one sliding rail 113, that portion forms a transport surface in a transport plane TE.

At the front end 1.11, located downstream in relation to the transport direction TA, and at the rear end 1.12, located upstream in relation to the transport direction TA, the at least one transport element 103 is guided in each case via deflection devices or guide rollers or wheels 141, 142. The at least one transport element 103 is guided at its front end 1.11 via a front deflection device 141 and at its rear end 1.12 via a rear deflection device 142. The at least one transport element 103 forms a transport route TS for the transport goods 102 between the front and rear deflection devices 141, 142. The transport route TS, on which the transport goods 102 can be conveyed, is therefore defined as extending from or starting at the rear deflection device 142 and extending to or ending at the front deflection device 141, as viewed in the transport direction TA.

In this situation provision can also be made for the front and/or the rear deflection devices 141, 142 to be configured so as to be capable of being driven by a motor. For example, the front and/or rear deflection devices 141, 142 can be configured as electric motors, or as gearless electric motors, for example, in the form of a directly driven electric motor, such as stepper motors, servomotors, or torque motors.

Additionally, the transport device 100, as indicated only schematically in FIG. 1, comprises a machine frame 110, which forms a framework on which all the components of the transport device 100 are arranged or accommodated, and by which the transport device 100 stands upright on a floor plane BE by support elements 101 or legs.

In this situation, the at least one sliding rail 113 is connected, at least in sections along the transport route TS, directly to the respective profile element 112 or support rail structure 112, which will be explained in greater detail hereinafter. The respective profile element 112 is in this situation connected in its turn to the at least one support body 111 of the machine frame 110, and specifically directly or indirectly. As can be seen from FIG. 2, the respective profile element 112 can also be connected by at least one connecting element 143 to the support body 111.

As can be seen in this context in greater detail from FIG. 2, the machine frame 110 comprises at least one support body 111, extending over the entire transport element width in the X-axis direction, i.e. transverse to the transport direction TA. The at least one support body 110 forms a basic support to receive further structural parts and components of the transport device 100, and securely arranged at which there are two support elements 101. The support body 111 forms in this situation a support element, for example a U-profile support made of steel, special steel, or other suitable material.

In the exemplary embodiment shown in FIG. 2, the machine frame 110 comprises two or even more support bodies 111, which are provided over the entire length of the transport route TS, i.e., in the Z-axis direction, distributed, for example, at equal distance intervals, and which, in each case, are supported on the floor plane BE by at least two support elements 101. In this situation, at least one support body 111 is provided in the region of the front end 1.11, and at least one further support body 111 is provided in the region of the rear end 1.12 of the transport device 100.

Figure 4:
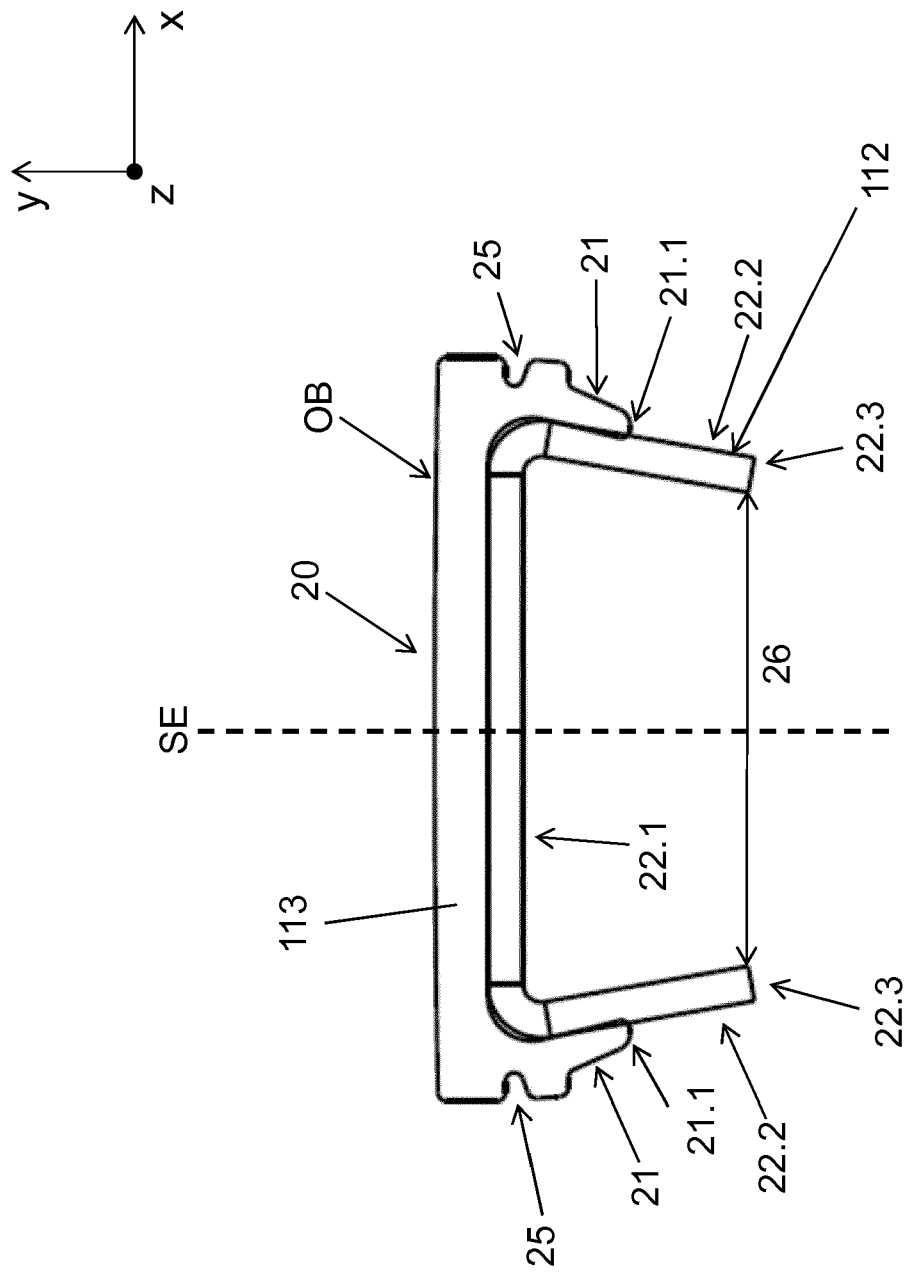
FIG. 4 shows a schematic front or cross-sectional view of the profile element and sliding rail shown in FIG. 3.

In this situation, the at least one profile element 112 can be configured in its cross-section surface, shown in the front view of FIG. 4, i.e., the XY plane, essentially in a C-shape, such as a C-profile element. The at least one profile element 112 comprises in this situation three limb sections, namely a middle limb section 22.1 and two lateral limb sections 22.2. Such types of profile elements 112 used in the field of transport devices 100 in the beverage industry may be known as C-profile elements. The profile elements 112 extend in the longitudinal direction in the direction of the Z-axis.

In this situation, the cross-section of the profile element 112 is configured as mirror-symmetrical to a mirror plane SE, wherein the mirror plane SE runs oriented parallel to the YZ plane. In the embodiment shown, the cross-section of the profile element 112 is configured as identical in the Z-axis direction.

As shown in the cross-sectional view of FIG. 4, each lateral limb section 22.2, together with the middle limb section 22.1, encloses or defines an angle of less than 90 degrees. The lateral limb sections 22.2 are angled inwardly, such that the respective free ends 22.3 of the two lateral limb sections 22.2 run toward one another and define an acute angle based on an imaginary elongation of the free ends 22.3 that would intersect in the mirror plane SE. The two lateral limb sections 22.2 are in this situation configured with their respective free ends 22.3 oriented towards one another. The middle limb section 22.1 and the lateral limb sections 22.2 therefore define, form, or partially enclose a cut-out opening 26 with its opening facing downwards, i.e., in direction of or toward the support body 111 when the profile element 112 is installed. The cut-out opening 26 in this situation therefore forms a slot or groove in which the connecting element 143 can be securely received and accommodated.

According to at least one exemplary embodiment, each sliding rail 113 is configured to be directly connected to the associated profile element 112 by being located and/or pressed onto the associated profile element 112 in a positive fit or friction fit or contact fit, at least in sections along the transport route TS, i.e., in the Z-axis direction. In at least one exemplary embodiment, the sliding rail 113 is located in positive fit onto the profile element 112 in such a way that it is held fixed in position as a result. Accordingly, a relative movement between the respective sliding rail 113 and the profile element 112 in the transport direction TA, or also transverse to the transport direction TA, is minimized or prevented. In at least one exemplary embodiment, provision can also additionally be made for the sliding rail 113 to be located and/or pressed onto the profile element 112 in positive and non-positive fit.

According to at least one exemplary embodiment, the corresponding sliding rail 113 is located over its entire respective longitudinal extension, which extends in the Z-axis direction, in positive fit on the related profile element 112, and is therefore held on the profile element 112. The corresponding sliding rail 113 can also be located over its entire respective longitudinal extension in positive and non-positive fit onto the profile element 112, and can therefore be held at the profile element 112.

The at least one transport element 103 is guided at least along the transport route TS on at least one sliding rail 113 in a sliding manner, wherein the at least one sliding rail 113 is provided in a plane parallel or essentially parallel beneath the transport plane TE. In at least one exemplary embodiment, several sliding rails 113 are provided, possibly along the entire transport route TS, along which the transport element 103 is moved.

It is possible to make provision that transversely, i.e., in the X-axis direction, as well as along the transport route TS, i.e., in the Z-axis direction, in each case several sliding rails 113 are located beneath the transport element 103. For example, as represented in FIG. 2, three sliding rails are provided, arranged transversely to the transport route TS, which are arranged in their respective longitudinal extension in the Z-axis direction essentially parallel to one another.

It is also possible for several sliding rails 113 to be provided not only transversely but also along the transport route TS, i.e., in the Z-axis direction, which are provided immediately adjacent to one another, such as over the entire length of the transport route TS. Further, the sliding rails 113, which are then provided in the longitudinal direction of the transport route TS, are arranged mutually flush with one another, and specifically in such a way that a straight row of sliding rails 113 is formed, arranged in such a way that they are immediately adjacent to one another.

In at least one exemplary embodiment, the sliding rails 113 comprise on their upper sides, facing towards the transport element 103, a surface which exhibits a low friction coefficient, which can be formed from a plastic or other suitable low-friction material.

The sliding rails 113 can be configured in their cross-section surface, shown in the front view in FIG. 4 or 5, i.e., in the XY plane, as essentially U-shaped, such as in the manner of a U-profile element. The respective sliding rail 113 comprises in this situation three limb sections, namely a web section 20, forming a basic part, and two lateral limb sections 21. The sliding rails 113 extend in their longitudinal direction in the Z-axis direction.

The respective sliding rail 113 is in this situation configured as being of one part or of one piece.

The cross-section of the respective sliding rail 113 is configured as mirror-symmetrical to the mirror plane SE, wherein the mirror plane SE runs oriented parallel to the YZ plane. The cross-section of the respective sliding rail 113 is configured as identical or essentially identical over its longitudinal extension in the Z-axis direction.

In this situation, the lateral limb sections 21 enclose in the cross-section with the web section 20 in each case an angle α which is less than 90 degrees, such that the respective free ends 21.1 of the two lateral limb sections 21 run inwardly toward one another at an acute angle in an imaginary prolongation of the free ends 21.1, which intersect in the mirror plane SE. The two lateral limb sections 21 are in this situation configured with their respective free ends 21.1 oriented towards one another.

In at least one possible exemplary embodiment, the two lateral limb sections 21 enclose with the web section 20 in each case an angle α in the range of 60 degrees to 85 degrees. In at least one other possible exemplary embodiment, the angle α is in the range of 65 degrees to 80 degrees. In at least one other possible exemplary embodiment, the angle α is 76 degrees or approximately 76 degrees, +/−two degrees. It should be understood that these degree ranges disclose all degrees within the range, including degrees in whole numbers and in tenths of a degree.

The angle α between the web section 20 and the respective limb sections 21 is configured in such a way that the elastically deformable limb sections 21 of the corresponding sliding rail 113 can be displaced and/or pressed in the perpendicular direction of movement, i.e., in the y-axis direction, when the sliding rail 113 is placed onto the respective profile element 112 and then held in place. The limb sections 21 are therefore configured as elastically deformable in such a way that at least the free ends 21.1, at the locating and/or pressing of the sliding rails 113 onto the profile element 112, are pushed apart from one another, and then come in contact again in positive fit onto the profile element 112, specifically at the lateral limb sections 22.2 of the profile element 112. In other words, the sliding rail 113 is clamped or snapped onto the profiled element 112 in a clamping or snap-fit connection.

In at least one exemplary embodiment, the lateral limb sections 21 of the sliding rail 113 are in contact in positive and non-positive fit with the lateral limb sections 22.2 of the profile element 112, and specifically under a definable pre-stressing force taking effect on the limb sections 22.2. In other words, therefore, the limb sections 21 of the sliding rail 113, even after the placement onto the profile element 112, still continue to exhibit a residual deformation, i.e., a deflection in comparison with the non-assembled state, such that a pre-stressing force comes into effect between the profile element 112 and the corresponding sliding rail 113. To further explain, in at least one exemplary embodiment, the lateral limb sections 21 have a specific angular orientation prior to installation of the sliding rail 113 onto the profile element 112. The distance between the free ends 21.1 is therefore less than the width of the profile element 112 where the free ends come into contact with the profile element 112 after installation. As a result, after installation of the sliding rail 113 onto the profile element 112, the free ends of 21.1 and their lateral limb sections 21.1 are pressed or displaced or deformed outwardly, such that the space between the free ends 21.1 after installation is greater than the space between the free ends 21.2 before installation. This creates a clamping action or tensioning or gripping force to ensure or promote a secure or very secure connection or fit between the sliding rail 113 and the profile element 112 without the need for additional securing devices or structures, such as screws, bolts, or similar attachment devices.

Due to the placement or pressing of the sliding rail 113 on the profile element 112, the inner contour of the sliding rail 113 is configured as being in positive contact with the outer contour of the profile element 112, such as over the entire longitudinal extension of the sliding rail 113, smooth and flat over its entire longitudinal extension, with the profile element 112. In this situation, provision can also be made that the lateral limb sections 21 of the sliding rail 113 engage at least partially around the lateral limb sections 22.2 of the profile element 112.

In other words, the clamping or snap-on fit between the sliding rail 113 and the profile element 112 results in the sliding rail 113 conforming to the shape or profile of the profile element 112. As discussed herein, the sliding rail 113 may have curved, wavy, or undulating portions along the length thereof, which thereby cause interruptions in a flat, smooth surface, and which interruptions can cause containers to be jostled or knocked over during transport. The secure fit or positive contact causes the sliding rail 113 to conform to the flat, smooth shape of the profile element 112, such that the sliding rail 113 presents a flat, smooth surface on which the transport elements 103 can run. In at least one exemplary embodiment, the sliding rail 113 is in positive fit or contact with the profile element 112 along the entire length, or essentially the entire length, or most of the entire length of the sliding rail 113. While a completely flat surface over the entire length of the sliding rail 113 may be ideal, it should be understood that some undulations or bumps or unevenness would be acceptable within manufacturing tolerances, provided that such unevenness does not result in containers being jostled or knocked over during transport.

In at least one exemplary embodiment, the at least one sliding rail 113 exhibits a weakening of material in the transition region from its corresponding web section 20 to the respective limb sections 21. In other words, the at least one sliding rail 113 has less material or a lesser thickness, as viewed in cross-section, such as in FIG. 4, at the transition region from its corresponding web section 20 to the respective limb sections 21. The weakening of material can be configured in the form of a sliding rail cut-out 25, in the form of a slot or groove, extending along the longitudinal extension of the sliding rail 113. By way of a specific change in the weakening of material, a defined deformation of the lateral limb sections 21 can be adjusted, as well as a restoring force which can be thereby created, in the mounted state of the sliding rail 113 on the profile element 112. A selected weakening of the material in combination with the dimensions of the lateral limb sections 21 allows for the precise determination of the possible deformation capacity of the lateral limb sections 21, and the forces to be applied in this situation. In other words, by selecting or adjusting the depth of the sliding rail cut-out 25, the thickness at this section can also be adjusted, which in turn determines deformability of the respective limb sections 21, as well as the resistance to deformation or elastic return force. For example, a smaller sliding rail cut-out 25 will result in a thicker transition section that provides greater resistance to deformation and a greater elastic return force than would a larger sliding rail cut-out 25 and its corresponding thinner transition section.

According to at least one exemplary embodiment, the at least one sliding rail 113 exhibits a strengthening or thickening of material in the transition region from its corresponding web section 20 to the respective limb sections 21, at the outer contour of the lateral web sections 21, such as in the form of an additional material beading. As a result, the situation can be achieved that, for the locating of the sliding rail 113 onto the profile element 112, a locating force must be applied for the elastic deflection of the lateral limb sections 21 which is greater in comparison with the previous embodiment variants, and, after the locating and/or pressing of such a sliding rail 113 onto the profile element 112, a greater restoration force can be produced. The restoration force of the lateral limb sections 21 forms in this situation a type of clamping force, with which these lateral limb sections 21 are in contact with the lateral limb sections 22.2 of the profile element 112.

According to at least one exemplary embodiment, the sliding rail 113, in its state of being located on the profile element 112 and therefore fully mounted, creates a clamping force of the lateral limb sections 21 to the lateral limb sections 22.2 of the profile element 112 of such strength that the sliding rail 113 is clamped securely in its positioning and location to the profile element 112. In at least one exemplary embodiment, the sliding rail 113, in its mounted state on the profile element 112, is secured or essentially secured against any or essentially any displacement of the sliding rail 113 relative to the profile element 112.

According to at least one exemplary embodiment, the at least one transport element 103 can be guided, at least in the transition region from the front deflection device 141 to the at least one sliding rail 113, at least in sections by at least one inlet finger. The at least one inlet finger is in this case configured in such a way as to form a transition of the at least one transport element 103 between the feed strand and return strand of the transport device 100 which imposes the least possible stress on the material. The at least one inlet finger forms a transition with low material stress of the at least one transport element 103 from the front deflection device 141 onto the at least one sliding rail 113. For this purpose, the at least one inlet finger is connected in a detachable manner to the at least one sliding rail 113 and/or to the at least one profile element 112. Provision can be made in this situation that the sliding rail 113 is located in positive fit on both the profile element 112 as well as on the inlet finger. This solution allows for the flatness to be achieved which is required for the transport of transport goods 102 which are not stable when standing, and therefore creates the preconditions for the use of economical components and allows for additional expensive connection elements to be omitted.

According to at least one exemplary embodiment, provision can be made that the at least one sliding rail 113 is cambered as convex in cross-section on its upper side OB, opposite the profile element 112, i.e., directed away from the profile element 112. The sliding rail 113 can be configured as cambered as convex in cross-section over its entire longitudinal extension on the upper side OB, or possibly over essentially all of the upper side OB.

Due to the convex shaping of the upper side OB, which is formed at the web section 20 of the sliding rail 113, the transport elements 103 lying on the sliding rails 113 can move by a certain amount about their longitudinal axis, and therefore, for example, even out height fluctuations or height deviations between directly adjacent transport elements 103, sliding rails 113, or also profile elements 112. Such an evening out or adjustment can compensate for situations in which two profile elements 112, that are arranged directly next to one another, exhibit a certain height misalignment. Due to the transport elements 103 moving on their longitudinal axis, this height misalignment can to some extent be evened out by the weight of the transport goods 102 standing on the transport elements 103. If a transport goods item 102 moves from a transport element 103 onto an adjacent transport element 103, the transport goods item 102 will not impact against an edge, but will instead slide free of any impact onto the next, adjacent, transport element 103. To further explain, if the upper surfaces OB of the sliding rails 113 are completely flat, then the transport elements 103 will lie completely flat against the upper surfaces OB. However, if one transport element 103 is disposed higher than an adjacent transport element 103, there will be an unevenness in the overall surface created by the transport elements 103, such that the outer edge of the higher transport element 103 is exposed. This situation could result in containers 102 being jostled or knocked over if they move from the lower transport element 103 to the higher transport element 103, that is, the container 102 will bump against or trip over the exposed edge. However, if the upper side OB has a convex or curved surface, the transport element 103 can tip or pivot or bend under the weight of the containers 102, thereby evening out any height misalignment and bringing the outer edges of adjacent transport elements 103 into alignment or contact with one another to form a smooth, flat transport surface.

The present application discloses a number of exemplary embodiments herein. It is understood that numerous modifications and derivations are possible, without thereby departing from the inventive concepts disclosed herein. It should also be understood that any component or part of one exemplary embodiment can be adapted for or used in or with any other exemplary embodiment.

The following is at least a partial list of components shown in the figures and their related reference numerals: transport device 100; support element 101; transport goods item 102; transport element 103; machine frame 110; support body 111; profile element 112; sliding rail 113; front deflection device 141; rear deflection device 142; connecting element 143; front end 1.11; rear end 1.12; web section 20; lateral limb sections 21; free end 21.1; middle limb section 22.1; lateral limb section 22.2; free end 22.3; sliding rail cut-out 25; cut-out 26; transport direction TA; floor plane BE; transport route TS; transport plane TE; mirror plane SE; upper side OB; and angle α.

At least one possible embodiment of the present application relates to a transport device for transporting transport goods 102 in a transport direction TA, comprising at least one machine frame 110, arranged on which is at least one transport element 103, forming a loop and driven such as to circulate, wherein the transport element 103 is guided via a front deflection device 141, related to the transport direction TA, as well as via a rear deflection device 142, related to the transport direction TA, wherein, between the front and rear deflection devices 141, 142, a transport route TS for the transport goods 102 is formed by means of the at least one transport element 103, wherein the at least one transport element 103 is guided in a sliding manner at least along the transport route TS on at least one sliding rail 113, wherein the at least one sliding rail 113 is connected directly to the profile element 112, at least in sections along the transport route TS, which in turn is connected to at least one support body 111 of the machine frame 110, wherein for the direct connection, the at least one sliding rail 113 is located and/or pressed in positive fit onto the profile element 112, at least in sections along the transport route TS.

At least one possible embodiment of the present application relates to the transport device wherein, for the direct connection, the at least one sliding rail 113 is located in positive and non-positive fit onto the profile element 112, at least in sections along the transport route TS.

At least one possible embodiment of the present application relates to the transport device wherein at least one sliding rail 113 is located in positive or non-positive fit onto the profile element 112 over its entire longitudinal extension, and is held in a fixed position at the profile element 112.

At least one possible embodiment of the present application relates to the transport device wherein the at least one sliding rail 113 is located in a fixed position onto the profile element 112 in a plane, parallel or essentially parallel, beneath a transport plane TE.

At least one possible embodiment of the present application relates to the transport device wherein the at least one sliding rail 113 forms a cross-section surface which is essentially U-shaped, in that the at least one sliding rail 113 comprises a web section 20, forming a basic part, as well as two limb sections 21 extending laterally from it.

At least one possible embodiment of the present application relates to the transport device wherein the at least one sliding rail 113 is configured as being one part or as one piece.

At least one possible embodiment of the present application relates to the transport device wherein the at least one sliding rail 113 is configured as mirror-symmetrical to a mirror plane SE oriented perpendicular to the transport plane TE.

At least one possible embodiment of the present application relates to the transport device wherein the at least one sliding rail 113 is configured as identical in cross-section over its longitudinal extension along the transport route TS.

At least one possible embodiment of the present application relates to the transport device wherein the lateral limb sections 21 enclose with the web section 20 in cross-section in each case an angle α of less than 90 degrees, wherein the angle α is between 85 degrees and 60 degrees, or between 80 degrees and 65 degrees, or is 76 degrees.

At least one possible embodiment of the present application relates to the transport device wherein the limb sections 21 are configured as elastically deformable in such a way that, when the sliding rail 113 is located onto the profile element 112, at least their free ends 21.1 are pressed apart from one another, and then again come in contact on the profile element 112 at least in positive fit.

At least one possible embodiment of the present application relates to the transport device wherein the limb sections 21 of the at least one sliding rail 113 are in contact in positive and non-positive fit with lateral limb sections 22.2 of the profile element 112, and under a defined pre-stressing force taking effect on the limb sections 22.2.

At least one possible embodiment of the present application relates to the transport device wherein, by the locating of the at least one sliding rail 113 onto the profile element 112, the inner contour of the sliding rail 113 is in positive contact at the outer contour of the profile element 112, and preferably over the entire longitudinal extension of the sliding rail 113.

At least one possible embodiment of the present application relates to the transport device wherein the at least one sliding rail 113 exhibits a weakening of the material in the transition region from the web section 20 to the lateral limb sections 21.

At least one possible embodiment of the present application relates to the transport device wherein the at least one sliding rail 113 exhibits a strengthening of material in the transition region from the web section 20 to the lateral limb sections 21 at the outer contour of the lateral limb sections 21.

At least one possible embodiment of the present application relates to the transport device wherein the at least one sliding rail 113 is located onto the profile element 112 and an inlet finger, in positive and/or non-positive fit.

At least one possible embodiment of the present application relates to the transport device wherein the at least one sliding rail 113 is cambered in cross-section as convex on its upper side OB.

At least one other possible embodiment of the present application relates to a beverage bottling machine configured to handle beverage bottles, said beverage bottling machine comprising: a first beverage bottling device, comprising one of: a beverage bottle filling device, a beverage bottle closing device, and a beverage bottle packaging device; a second beverage bottling device, comprising one of: a beverage bottle filling device, a beverage bottle closing device, and a beverage bottle packaging device; a beverage bottle transport device being configured and disposed to transport beverage bottles in a transport direction from said first beverage bottling device to said second beverage bottling device; and said beverage bottle transport device comprising: a support frame and at least one support rail structure being mounted thereon; said at least one support rail structure being elongated and disposed with its length essentially parallel to the transport direction; at least one transport element being configured and disposed to be driven in a circulating manner in a loop around a first deflection device and a second deflection device disposed at opposite ends of the loop; said at least one transport element being configured to form a beverage bottle transport surface configured to support beverage bottles thereon and transport beverage bottles in the transport direction between said first deflection device and said second deflection device; said at least one transport element being supported on said at least one support rail structure between said first deflection device and said second deflection device and being configured to slide on said at least one support rail structure; at least one sliding rail structure being connected to said at least one support rail structure between said at least one support rail structure and said at least one transport element; said at least one sliding rail structure being configured and disposed to provide a sliding surface to permit said at least one transport element to slide along said at least one support rail structure; and said at least one sliding rail structure being connected to said at least one support rail structure by an interlocking or form fit at least in sections along the length of said at least one support rail structure.

At least one possible embodiment of the present application relates to a beverage bottle transport device being configured and disposed to transport beverage bottles in a transport direction from a first beverage bottling device to a second beverage bottling device, said beverage bottle transport device comprising: a support frame and at least one support rail structure being mounted thereon; said at least one support rail structure being elongated and disposed with its length essentially parallel to the transport direction; at least one transport element being configured and disposed to be driven in a circulating manner in a loop around a first deflection device and a second deflection device disposed at opposite ends of the loop; said at least one transport element being configured to form a beverage bottle transport surface configured to support beverage bottles thereon and transport beverage bottles in the transport direction between said first deflection device and said second deflection device; said at least one transport element being supported on said at least one support rail structure between said first deflection device and said second deflection device and being configured to slide on said at least one support rail structure; at least one sliding rail structure being connected to said at least one support rail structure between said at least one support rail structure and said at least one transport element; said at least one sliding rail structure being configured and disposed to provide a sliding surface to permit said at least one transport element to slide along said at least one support rail structure; and said at least one sliding rail structure being connected to said at least one support rail structure by an interlocking or form fit at least in sections along the length of said at least one support rail structure.

At least one possible embodiment of the present application relates to the beverage bottle transport device, wherein: said at least one sliding rail structure has a U-shaped cross section and comprises a first limb section, a second limb section, and a first web section disposed to connect said first and second limb sections; said first and second limb sections are disposed transverse to and to extend from said first web section inwardly at an angle, such that the gap distance between the ends of said first and second limb sections is less than the cross-sectional width of said first web section; said at least one support rail structure has a U-shaped cross section and comprises a third limb section, a fourth limb section, and a second web section disposed to connect said third and fourth limb sections; said third and fourth limb sections are disposed transverse to and to extend from said second web section inwardly at an angle, such that the gap distance between the ends of said third and fourth limb sections is less than the cross-sectional width of said second web section; said first and second limb sections are elastically deformable to permit said at least one sliding rail structure to be snap fit onto an upper exterior portion of said at least one support rail structure, such that said at least one sliding rail structure is held onto said at least one support rail structure by an interlocking design and by a clamping force; and said first and second limb sections are elastically deformable to permit said first and second limb sections: to be temporarily displaced away from one another by an external displacement force to increase the gap distance between said first and second limb sections to be greater than the cross-sectional width of said second web section to permit said at least one sliding rail structure to be pressed onto said at least one support rail structure, and to be displaced inwardly toward one another by an elastic return force to permit said first and second limb sections to contact said at least one support rail structure to create said form fit and said clamping fit.

At least one possible embodiment of the present application relates to the beverage bottle transport device, wherein: upon installation of said at least one sliding rail structure onto said at least one support rail structure, an inner surface of said first limb section is in contact with an outer surface of said third limb section, and an inner surface of said second limb section is in contact with an outer surface of said fourth limb section; and the cross-sectional width of said at least one support rail structure, from said outer surface of said third limb section to said outer surface of said fourth limb section, is greater than the gap distance between the ends of said first and second limb sections prior to installation, such that said first and second limbs are subject to a pressing force to increase said the strength of said clamping fit.

At least one other possible embodiment of the present application relates to a transport device being configured and disposed to transport products, such as bottles, cans, boxes, pouches, and similar containers, individually or in groups or packages, in a transport direction from a first product handling device to a second product handling device, said transport device comprising: a support frame and at least one support rail structure being mounted thereon; said at least one support rail structure being elongated and disposed with its length essentially parallel to the transport direction; at least one transport element being configured and disposed to be driven in a circulating manner in a loop around a first deflection device and a second deflection device disposed at opposite ends of the loop; said at least one transport element being configured to form a product transport surface configured to support products thereon and transport products in the transport direction between said first deflection device and said second deflection device; said at least one transport element being supported on said at least one support rail structure between said first deflection device and said second deflection device and being configured to slide on said at least one support rail structure; at least one sliding rail structure being connected to said at least one support rail structure between said at least one support rail structure and said at least one transport element; said at least one sliding rail structure being configured and disposed to provide a sliding surface to permit said at least one transport element to slide along said at least one support rail structure; and said at least one sliding rail structure being connected to said at least one support rail structure by an interlocking or form fit at least in sections along the length of said at least one support rail structure.

At least one other possible embodiment of the present application relates to the transport device, wherein said at least one sliding rail structure is also connected to said at least one support rail structure by a friction fit at least in sections along the length of said at least one support rail structure.

At least one other possible embodiment of the present application relates to the transport device, wherein said at least one sliding rail structure is connected to said at least one support rail structure by said interlocking or form fit and said friction fit along the entire length or essentially the entire length of said at least one support rail structure.

At least one other possible embodiment of the present application relates to the transport device, wherein said at least one sliding rail structure is located in a fixed position on said at least one support rail structure in a plane parallel or essentially parallel to a transport plane defined by said product transport surface.

At least one other possible embodiment of the present application relates to the transport device, wherein: said at least one sliding rail structure comprises a cross-section being essentially U-shaped; said at least one sliding rail structure comprises a first limb section, a second limb section, and a web section disposed to connect said first and second limb sections; and said first and second limb sections are disposed transverse to and to extend from said web section.

At least one other possible embodiment of the present application relates to the transport device, wherein: said at least one sliding rail structure is configured as a one-piece structure; and said at least one sliding rail structure is configured to be symmetrical as viewed in a longitudinal cross-section with respect to a plane oriented perpendicular to the transport plane along the length of said at least one sliding rail structure.

At least one other possible embodiment of the present application relates to the transport device, wherein said first and second limb sections are oriented at an angle with respect to said web section said angle being one of: less than 90 degrees; or in the range of 60 degrees to 85 degrees; or in the range of 65 degrees to 80 degrees; or is approximately 76 degrees.

At least one other possible embodiment of the present application relates to the transport device, wherein said first and second limb sections are elastically deformable to permit said first and second limb sections: to be temporarily displaced away from one another by a displacement force to permit said at least one sliding rail structure to be pressed onto said at least one support rail structure, and to be displaced inwardly toward one another by a return force to permit said first and second limb sections to contact said at least one support rail structure to create said friction fit.

At least one other possible embodiment of the present application relates to the transport device, wherein: said at least one support rail structure comprises a first limb section, a second limb section, and a web section disposed to connect said first and second limb sections; said first and second limb sections are disposed transverse to and to extend from said web section; said first and second limb sections of said at least one sliding rail structure, upon connection of said at least one sliding rail structure to said at least one support rail structure, are configured and disposed to contact, in both a form fit and a friction fit, outer surfaces of said first and second limb sections of said at least one support rail structure; and said first and second limb sections of said at least one sliding rail structure exert a pressing or clamping force on said first and second limb sections of said at least one support rail structure to create said friction fit.

At least one other possible embodiment of the present application relates to the transport device, wherein the inner cross-sectional profile of said at least one sliding rail structure is essentially similar to at least a portion of the outer cross-sectional profile of said at least one support rail structure to permit a form or interlocking fit between said at least one sliding rail structure and said at least one support rail structure over the length of said at least one sliding rail structure.

At least one other possible embodiment of the present application relates to the transport device, wherein the thickness of said at least one sliding rail structure at a first portion of a transition region from said web section to each of said first and second limb sections is less than the thickness of a second portion of said transition region.

At least one other possible embodiment of the present application relates to the transport device, wherein said second portion of said transition region has a greater thickness than said first portion and said first and second limb sections.

At least one other possible embodiment of the present application relates to the transport device, wherein said at least one sliding rail structure is further connected to an inlet finger disposed at the end of said at least one support rail structure adjacent said first deflection device.

At least one other possible embodiment of the present application relates to the transport device, wherein said at least one sliding rail structure comprises a convex upper surface.

At least one other possible embodiment of the present application relates to the transport device, wherein: said at least one sliding rail structure has a U-shaped cross section and comprises a first limb section, a second limb section, and a first web section disposed to connect said first and second limb sections; said first and second limb sections are disposed transverse to and to extend from said first web section inwardly at an angle, such that the gap distance between the ends of said first and second limb sections is less than the cross-sectional width of said first web section; said at least one support rail structure has a U-shaped cross section and comprises a third limb section, a fourth limb section, and a second web section disposed to connect said third and fourth limb sections; said third and fourth limb sections are disposed transverse to and to extend from said second web section inwardly at an angle, such that the gap distance between the ends of said third and fourth limb sections is less than the cross-sectional width of said second web section; said first and second limb sections are elastically deformable to permit said at least one sliding rail structure to be snap fit onto an upper exterior portion of said at least one support rail structure, such that said at least one sliding rail structure is held onto said at least one support rail structure by an interlocking design and by a clamping force; and said first and second limb sections are elastically deformable to permit said first and second limb sections: to be temporarily displaced away from one another by an external displacement force to increase the gap distance between said first and second limb sections to be greater than the cross-sectional width of said second web section to permit said at least one sliding rail structure to be pressed onto said at least one support rail structure, and to be displaced inwardly toward one another by an elastic return force to permit said first and second limb sections to contact said at least one support rail structure to create said form fit and said clamping fit.

At least one other possible embodiment of the present application relates to the transport device, wherein: upon installation of said at least one sliding rail structure onto said at least one support rail structure, an inner surface of said first limb section is in contact with an outer surface of said third limb section, and an inner surface of said second limb section is in contact with an outer surface of said fourth limb section; and the cross-sectional width of said at least one support rail structure, from said outer surface of said third limb section to said outer surface of said fourth limb section, is greater than the gap distance between the ends of said first and second limb sections prior to installation, such that said first and second limbs are subject to a pressing force to increase said the strength of said clamping fit.

The entirety of the appended drawings, including all dimensions, proportions, and/or shapes disclosed thereby or reasonably understood therefrom, are hereby incorporated by reference.

All of the patents, patent applications, patent publications, and other documents cited herein, are hereby incorporated by reference as if set forth in their entirety herein.

The corresponding foreign or international patent applications, as originally filed and as published, from which the present application claims the benefit of priority, are hereby incorporated by reference as if set forth in their entirety herein, as follows: International Patent Application No. PCT/EP2019/071673 and Federal Republic of Germany Patent Application No. DE102018119914.7.

The following patents, patent applications, patent publications, and other documents cited in the corresponding foreign or international patent applications listed in the preceding paragraph are hereby incorporated by reference as if set forth in their entirety herein, as follows: WO0234650A1; US2004216987A1; JP3942008B2; U.S. Pat. No. 6,170,649B1; U.S. Pat. No. 7,753,194B1; NL2004378C2; DE19637353A1; U.S. Pat. No. 4,793,470A1.

Although the invention has been described in detail for the purpose of illustration of any embodiments disclosed herein, including the most practical or preferred embodiments at the time of filing of this application, it is to be understood that such detail is solely for that purpose and that the invention is not limited to such embodiments, but, on the contrary, is intended to cover modifications and equivalent arrangements that are within the spirit and scope of the present application, including the specification and the claims as originally filed, as amended, or as issued. For example, it is to be understood that the present invention contemplates that, to the extent possible, one or more features or components of any disclosed embodiment can be combined with one or more features or components of any other disclosed embodiment.

What is claimed is:

1. A beverage bottle transport device being configured and disposed to transport beverage bottles in a transport direction from a first beverage bottling device to a second beverage bottling device, said beverage bottle transport device comprising:

a support frame and at least one support rail structure being mounted thereon;

said at least one support rail structure being elongated and disposed with its length essentially parallel to the transport direction;

at least one transport element being configured and disposed to be driven in a circulating manner in a loop around a first deflection device and a second deflection device disposed at opposite ends of the loop;

said at least one transport element being configured to form a beverage bottle transport surface configured to support beverage bottles thereon and transport beverage bottles in the transport direction between said first deflection device and said second deflection device;

said at least one transport element being supported on said at least one support rail structure between said first deflection device and said second deflection device and being configured to slide on said at least one support rail structure;

at least one sliding rail structure being connected to said at least one support rail structure between said at least one support rail structure and said at least one transport element;

said at least one sliding rail structure being configured and disposed to provide a sliding surface to permit said at least one transport element to slide along said at least one support rail structure; and said at least one sliding rail structure being connected to said at least one support rail structure by an interlocking or form fit at least in sections along the length of said at least one support rail structure;

said at least one sliding rail structure having a U-shaped cross section with a first limb section, a second limb section, and a first web section disposed to connect said first and second limb sections;

said first and second limb sections being disposed transverse to and extending from said first web section inwardly at an angle, such that a gap distance between the ends of said first and second limb sections is less than a cross-sectional width of said first web section; and wherein:

said at least one support rail structure has a U-shaped cross section and comprises a third limb section, a fourth limb section, and a second web section disposed to connect said third and fourth limb sections;

said third and fourth limb sections are disposed transverse to and to extend from said second web section inwardly at an angle, such that the gap distance between the ends of said third and fourth limb sections is less than the cross-sectional width of said second web section;

said first and second limb sections are elastically deformable to permit said at least one sliding rail structure to be snap fit onto an upper exterior portion of said at least one support rail structure, such that said at least one sliding rail structure is held onto said at least one support rail structure by an interlocking design and by a clamping force; and said first and second limb sections are elastically deformable to permit said first and second limb sections:

to be temporarily displaced away from one another by an external displacement force to increase the gap distance between said first and second limb sections to be greater than the cross-sectional width of said second web section to permit said at least one sliding rail structure to be pressed onto said at least one support rail structure, and to be displaced inwardly toward one another by an elastic return force to permit said first and second limb sections to contact said at least one support rail structure to create said form fit and said clamping fit.

2. The beverage bottle transport device according to claim 1, wherein:
upon installation of said at least one sliding rail structure onto said at least one support rail structure, an inner surface of said first limb section is in contact with an outer surface of said third limb section, and an inner surface of said second limb section is in contact with an outer surface of said fourth limb section; and
the cross-sectional width of said at least one support rail structure, from said outer surface of said third limb section to said outer surface of said fourth limb section, is greater than the gap distance between the ends of said first and second limb sections prior to installation, such that said first and second limbs are subject to a pressing force to increase said the strength of said clamping fit.

3. A transport device being configured and disposed to transport products, such as bottles, cans, boxes, pouches, and similar containers, individually or in groups or packages, in a transport direction from a first product handling device to a second product handling device, said transport device comprising:
a support frame and at least one support rail structure being mounted thereon;
said at least one support rail structure being elongated and disposed with its length essentially parallel to the transport direction;
at least one transport element being configured and disposed to be driven in a circulating manner in a loop around a first deflection device and a second deflection device disposed at opposite ends of the loop;
said at least one transport element being configured to form a product transport surface configured to support products thereon and transport products in the transport direction between said first deflection device and said second deflection device;
said at least one transport element being supported on said at least one support rail structure between said first deflection device and said second deflection device and being configured to slide on said at least one support rail structure;
at least one sliding rail structure being connected to said at least one support rail structure between said at least one support rail structure and said at least one transport element;
said at least one sliding rail structure being configured and disposed to provide a sliding surface to permit said at least one transport element to slide along said at least one support rail structure; and
said at least one sliding rail structure being connected to said at least one support rail structure by an interlocking or form fit at least in sections along the length of said at least one support rail structure;
said at least one sliding rail structure having a substantially U-shaped cross-section with first and second limb sections and a central web section between said first and second limb sections; and
said first and second limb sections being elastically deformable to permit said first and second limb sections:
to be temporarily displaced away from one another by a displacement force to permit said at least one sliding rail structure to be pressed onto said at least one support rail structure, and
to be displaced inwardly toward one another by a return force to permit said first and second limb sections to contact said at least one support rail structure to create said interlocking or form fit;

wherein:
said first and second limb sections are disposed transverse to and to extend from said web section;
said first and second limb sections of said at least one sliding rail structure, upon connection of said at least one sliding rail structure to said at least one support rail structure, are configured and disposed to contact, in both a form fit and a friction fit, outer surfaces of said first and second limb sections of said at least one support rail structure; and
said first and second limb sections of said at least one sliding rail structure exert a pressing or clamping force on said first and second limb sections of said at least one support rail structure to create said friction fit;
the inner cross-sectional profile of said at least one sliding rail structure is substantially similar to at least a portion of the outer cross-sectional profile of said at least one support rail structure to permit a form or interlocking fit between said at least one sliding rail structure and said at least one support rail structure over the length of said at least one sliding rail structure; and
wherein the thickness of said at least one sliding rail structure at a first portion of a transition region from said web section to each of said first and second limb sections is less than the thickness of a second portion of said transition region.

4. The transport device according to claim 3, wherein said at least one sliding rail structure is also connected to said at least one support rail structure by a friction fit at least in sections along the length of said at least one support rail structure.

5. The transport device according to claim 4, wherein said at least one sliding rail structure is connected to said at least one support rail structure by said interlocking or form fit and said friction fit along the entire length or essentially the entire length of said at least one support rail structure.

6. The transport device according to claim 5, wherein said at least one sliding rail structure is located in a fixed position on said at least one support rail structure in a plane parallel or essentially parallel to a transport plane defined by said product transport surface.

7. The transport device according to claim 6, wherein:
said at least one sliding rail structure comprises a cross-section being essentially U-shaped;
said at least one sliding rail structure comprises a first limb section, a second limb section, and a web section disposed to connect said first and second limb sections; and
said first and second limb sections are disposed transverse to and to extend from said web section.

8. The transport device according to claim 7, wherein:
said at least one sliding rail structure is configured as a one-piece structure; and
said at least one sliding rail structure is configured to be symmetrical as viewed in a longitudinal cross-section with respect to a plane oriented perpendicular to the transport plane along the length of said at least one sliding rail structure.

9. The transport device according to claim 3, wherein said first and second limb sections are oriented at an angle with respect to said web section, said angle being one of:
less than 90 degrees; or
in the range of 60 degrees to 85 degrees; or
in the range of 65 degrees to 80 degrees; or
approximately 76 degrees.

10. The transport device according to claim 3, wherein said second portion of said transition region has a greater thickness than said first portion and said first and second limb sections.

11. The transport device according to claim 10, wherein said at least one sliding rail structure is further connected to an inlet finger disposed at the end of said at least one support rail structure adjacent said first deflection device.

12. The transport device according to claim 11, wherein said at least one sliding rail structure comprises a convex upper surface.

13. A transport device being configured and disposed to transport products, such as bottles, cans, boxes, pouches, and similar containers, individually or in groups or packages, in a transport direction from a first product handling device to a second product handling device, said transport device comprising:
- a support frame and at least one support rail structure being mounted thereon;
- said at least one support rail structure being elongated and disposed with its length essentially parallel to the transport direction;
- at least one transport element being configured and disposed to be driven in a circulating manner in a loop around a first deflection device and a second deflection device disposed at opposite ends of the loop;
- said at least one transport element being configured to form a product transport surface configured to support products thereon and transport products in the transport direction between said first deflection device and said second deflection device;
- said at least one transport element being supported on said at least one support rail structure between said first deflection device and said second deflection device and being configured to slide on said at least one support rail structure;
- at least one sliding rail structure being connected to said at least one support rail structure between said at least one support rail structure and said at least one transport element;
- said at least one sliding rail structure being configured and disposed to provide a sliding surface to permit said at least one transport element to slide along said at least one support rail structure; and
- said at least one sliding rail structure being connected to said at least one support rail structure by an interlocking or form fit at least in sections along the length of said at least one support rail structure;
    - said at least one sliding rail structure having a substantially U-shaped cross-section with first and second limb sections and a central web section between said first and second limb sections; and
    - said first and second limb sections being elastically deformable to permit said first and second limb sections:
        - to be temporarily displaced away from one another by a displacement force to permit said at least one sliding rail structure to be pressed onto said at least one support rail structure, and
        - to be displaced inwardly toward one another by a return force to permit said first and second limb sections to contact said at least one support rail structure to create said interlocking or form fit;

wherein:
- said at least one sliding rail structure is also connected to said at least one support rail structure by a friction fit at least in sections along the length of said at least one support rail structure;
- said first and second limb sections are disposed transverse to and to extend from said first web section inwardly at an angle, such that the gap distance between the ends of said first and second limb sections is less than the cross-sectional width of said first web section;
- said at least one support rail structure has a U-shaped cross section and comprises a third limb section, a fourth limb section, and a second web section disposed to connect said third and fourth limb sections;
- said third and fourth limb sections are disposed transverse to and to extend from said second web section inwardly at an angle, such that the gap distance between the ends of said third and fourth limb sections is less than the cross-sectional width of said second web section;
- said first and second limb sections are elastically deformable to permit said at least one sliding rail structure to be snap fit onto an upper exterior portion of said at least one support rail structure, such that said at least one sliding rail structure is held onto said at least one support rail structure by an interlocking design and by a clamping force; and
- said first and second limb sections are elastically deformable to permit said first and second limb sections:
    - to be temporarily displaced away from one another by an external displacement force to increase the gap distance between said first and second limb sections to be greater than the cross-sectional width of said second web section to permit said at least one sliding rail structure to be pressed onto said at least one support rail structure, and
    - to be displaced inwardly toward one another by an elastic return force to permit said first and second limb sections to contact said at least one support rail structure to create said form fit and said clamping fit.

14. The transport device according to claim 13, wherein:
- upon installation of said at least one sliding rail structure onto said at least one support rail structure, an inner surface of said first limb section is in contact with an outer surface of said third limb section, and an inner surface of said second limb section is in contact with an outer surface of said fourth limb section; and
- the cross-sectional width of said at least one support rail structure, from said outer surface of said third limb section to said outer surface of said fourth limb section, is greater than the gap distance between the ends of said first and second limb sections prior to installation, such that said first and second limbs are subject to a pressing force to increase said the strength of said clamping fit.

15. A beverage container transport device being configured and disposed to transport beverage containers in a transport direction in a beverage filling machine, the beverage container transport device comprising:
- a support frame and at least one support rail structure being mounted thereon;
- said at least one support rail structure being elongated and extending substantially parallel to the transport direction;
- at least one transport element being configured and disposed to be driven in a circulating manner in a loop around a first deflection device and a second deflection device disposed at opposite ends of the loop;
- said at least one transport element being configured to form a beverage container transport surface configured to support beverage containers thereon and transport beverage containers in the transport direction between said first deflection device and said second deflection device;

said at least one transport element being supported on said at least one support rail structure between said first deflection device and said second deflection device and being configured to slide on said at least one support rail structure;

at least one sliding rail structure being connected to said at least one support rail structure between said at least one support rail structure and said at least one transport element;

said at least one sliding rail structure being configured and disposed to provide a sliding surface to permit said at least one transport element to slide along said at least one support rail structure;

said at least one sliding rail structure having a U-shaped cross section with a first limb section, a second limb section, and a web section disposed to connect said first and second limb sections;

said web section having an upper surface forming a sliding surface with a convex shape in a direction transversely to the transport direction, said sliding surface extending transversely substantially along an entire width of said web section and said at least one transport element being disposed to contact the entire sliding surface when said at least one sliding rail structure is installed on said at least one support rail;

said first and second limb sections extending downwardly from said first web section and inwardly at an angle towards one another, such that a gap distance between ends of said first and second limb sections is less than a cross-sectional width of said web section, such that, when sa id at least one sliding rail structure is disposed on said at least one support rail structure, said at least one sliding rail structure engages said at least one support rail structure with an interlocking or form fit at least in sections along the length of said at least one support rail structure.

* * * * *